United States Patent
Gustave et al.

(10) Patent No.: US 7,631,344 B2
(45) Date of Patent: Dec. 8, 2009

(54) DISTRIBUTED AUTHENTICATION FRAMEWORK STACK

(75) Inventors: Christophe Gustave, Aylmer (CA); Bertrand Marquet, Ottawa (CA); Olivier Le Moigne, Ottawa (CA)

(73) Assignee: Alcatel Lucent, Paris (FR)

( * ) Notice: Subject to any disclaimer, the term of this patent is extended or adjusted under 35 U.S.C. 154(b) by 786 days.

(21) Appl. No.: 10/699,665

(22) Filed: Nov. 4, 2003

(65) Prior Publication Data
US 2005/0097322 A1 May 5, 2005

(51) Int. Cl.
G06F 7/04 (2006.01)
G06F 17/30 (2006.01)
G06F 21/00 (2006.01)
H04L 9/32 (2006.01)

(52) U.S. Cl. .......... 726/2; 726/3; 726/4; 713/182; 713/185; 713/186

(58) Field of Classification Search .......... None
See application file for complete search history.

(56) References Cited

U.S. PATENT DOCUMENTS

| | | | |
|---|---|---|---|
| 6,219,790 B1 | 4/2001 | Lloyd et al. | |
| 6,256,737 B1 * | 7/2001 | Bianco et al. | 713/186 |
| 6,510,236 B1 | 1/2003 | Crane et al. | |
| 6,587,880 B1 * | 7/2003 | Saigo et al. | 709/225 |
| 6,678,828 B1 * | 1/2004 | Pham et al. | 726/2 |
| 6,760,444 B1 * | 7/2004 | Leung | 380/270 |
| 7,017,051 B2 * | 3/2006 | Patrick | 726/12 |
| 2003/0012382 A1 * | 1/2003 | Ferchichi et al. | 380/270 |
| 2003/0154373 A1 * | 8/2003 | Shimada et al. | 713/168 |

OTHER PUBLICATIONS

David D. Riley, Data Abstraction and Structure Using C++, 1997, Jones and Bartlett Publishers, p. 169.*
Sun Microsystems, Sun One Identity Server 6.0 Release Information, XP-002319341, sun.com/software.
Samar, Vipin, Unified Login with Pluggable Authentication Modules (PAM), XP-000620972, SunSoft, Inc., Mar. 14, 1996.
Samar, Vipin, Making Login Services Independent of Authentication Technologies, SunSoft, Inc.
Sun Microsystems, Sun One Identity Server Overview, Mar. 2003.

* cited by examiner

*Primary Examiner*—Benjamin E Lanier
(74) *Attorney, Agent, or Firm*—Kramer & Amado, P.C.

(57) ABSTRACT

A distributed authentication framework is presented. The framework includes an authentication stack that is created by an authentication server. The server receives an authentication request from an end-user, the request including an authentication domain ID that distinguishes the end-user. The authentication stack has entries that trigger local or remote specific authentication actions providing respective results. When the results are consolidated the authentication status of the end-user is determined.

3 Claims, 4 Drawing Sheets

DISTRIBUTED AUTHENTICATION FRAMEWORK STACK

FIELD OF THE INVENTION

This invention relates to computer-based communication systems and more particularly to methods and systems for providing authentication to end user applications.

BACKGROUND

The rapid advance in computer-based communications systems, such as the public Internet and private Intranet, has meant that more and more data is being transmitted via this medium. For much of this data, including financial and health records security is extremely important. As a result, considerable development has gone into creating security mechanisms. Concomitant with these developments is the effort by hackers and other system attackers to find ways to break the security mechanisms. One way to reduce attacks is to ensure that users of the system, whether to receive data or to send data, are who they say they are. This has resulted in a range of authentication services being built for network users.

Authentication systems are typically incorporated into computer based communication systems to verify a user's right to access network resources. In a basic application when a user logs into the computer system an authentication process is initiated to verify the identity of the user. A common login process involves the entry of a password. The computer system compares the password with a stored list and, if the entered code matches the stored list, access is authorized. Conversely, if there is no match authentication is denied.

Basic password systems, although sufficient for low security related applications, do not provide the level of security needed for more sensitive transmissions. The password may be stolen or may be replicated using a trial and error or dictionary approach.

Other authentication services such as biometric schemes i.e. iris scanning, use multiple factors to authenticate users as when using smart cards.

In a distributed system in which there are multiple servers and multiple authentication schemes it has been difficult to create a system which meets all the needs. For example, various applications may be running on different network elements and network management platforms wherein there is a need to provide identification and subsequently authentication of end user operators in order to perform access control to the network infrastructure. One solution consists of delegating the authentication to a third party entity so that the "a-priori" untrusted operator cannot fake the authentication process. In other cases the authentication policy is implemented on a per-application basis so that the operator needs to authenticate against different authentication mechanisms. This typically means that the mechanism used to achieve user authentication must rely on distributed devices that cannot be accessed directly using classical on the wire protocols.

An example of a prior art authentication systems is discussed in a Sun White paper entitled "Making Log In Services Independent of Authentication Technologies" by Samar and Lie. This paper describes a system wherein the authentication policy is enforced on the machine hosting the user to be authenticated. The solution makes use of a pluggable authentication module (PAM) to switch from one authentication backend to another. Using this mechanism the overall authentication process takes place locally at the user's work station. Since it does not make use of a trusted third party entity this solution does not fit in a general use case where the host is not trusted.

A second prior art solution is described in a technical white paper dated March 2003 entitled "Sun One Identity Server Overview". This solution makes use of a dedicated authentication server which allows a dedicated application server to handle incoming authenticated requests. The server maintains a trusted relationship with the user.

A similar system is described in U.S. Pat. No. 6,510,236 which relates to an authentication framework for managing authentication results from multiple authentication devices. For each type of authentication device a device authentication server verifies that the data is acceptable.

These solutions generally solve the security issues inherent in the first prior art solution. However the solutions are not sufficiently flexible to handle a wide range of authentication schemes that could potentially be distributed across various elements of the network. In addition, these mechanisms and in particular that taught in the first prior art may be subject to tampering by an attacker.

SUMMARY OF THE INVENTION

Accordingly, there is a need for a dedicated authentication server that performs the authentication of a end user. The server should be able to act transparently from the client's perspective to provide authentication services for a distributed system. The present invention provides this through the use of an authentication stack which has entries that trigger local or remote specific authentication actions to provide respective results which, when consolidated determine an authentication status of the end user client. Preferably, the authentication is created based on an authentication domain ID specified by the end user client.

Therefore, in accordance with a first aspect of the present invention there is provided a method of authenticating an end-user client in a computer-based communication system comprising the steps of: sending, by the end-user client, an authentication domain identifier to an authentication server; creating, by the authentication server and depending on the authentication domain identifier, an authentication stack comprising one or more stack entries; rendering, for each stack entry and depending thereon, an authentication service to produce an authentication result for that entry; and consolidating authentication results to obtain an authentication status for the end-user client.

BRIEF DESCRIPTION OF THE DRAWINGS

The invention will now be described in greater detail with reference to the attached drawings wherein.

DETAILED DESCRIPTION OF THE INVENTION

Figure 1:
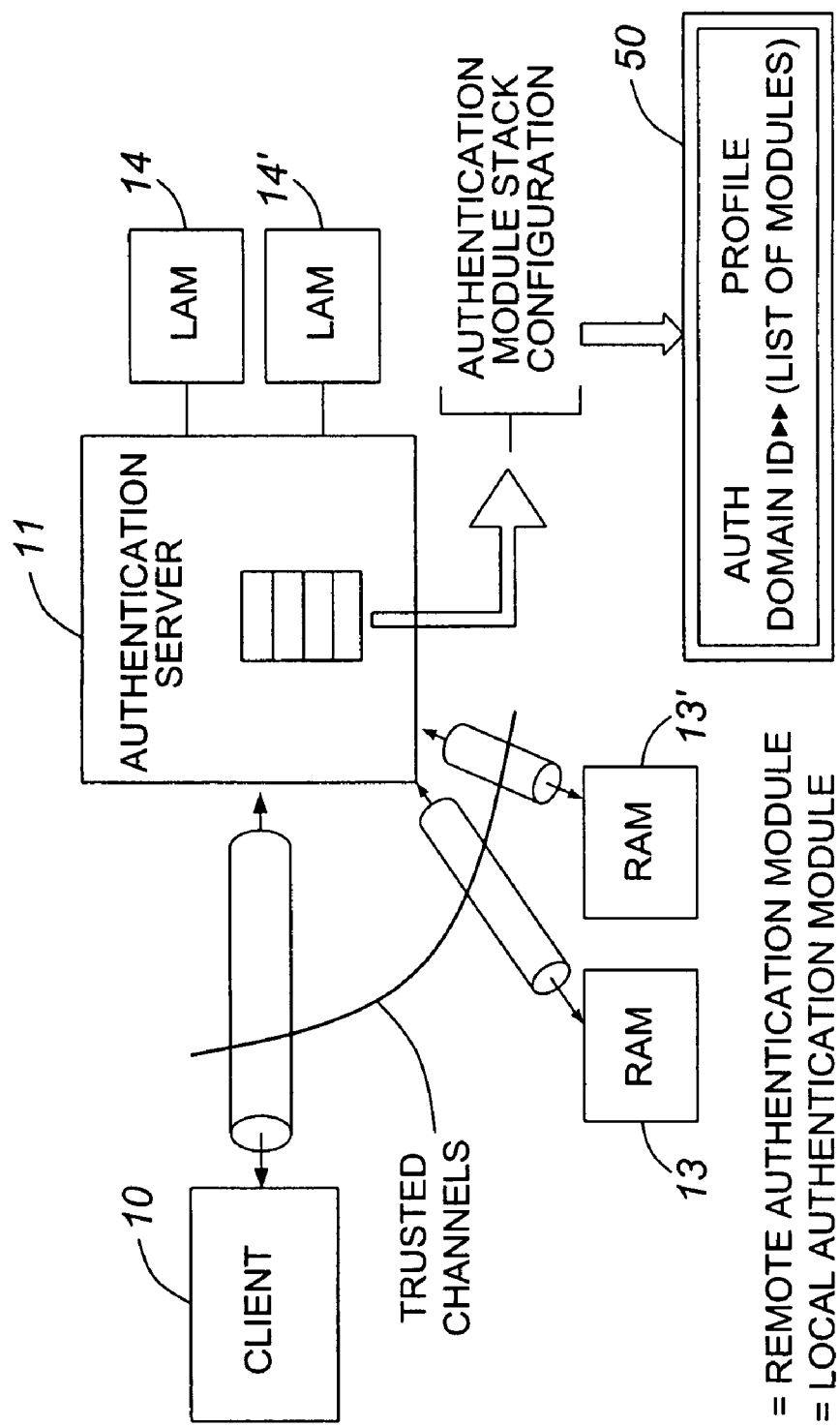
FIG. 1 illustrates the basic components of the authentication framework according to the present invention.

FIG. 1 shows the basic components of the authentication framework according to the present invention. Using the framework an end user is able to authenticate through a stacking mechanism. As shown in FIG. 1 a client 10 on log in sends a message such as an authentication domain ID to an authentication server 11. A server builds an authentication model stack configuration 12 which provides a profile of the client based on the authentication domain ID. Through the authentication stack the authentication server is able to seek authentication through either remote authentication modules 13, 13' or local authentication modules 14, 14'. Each time a user triggers the authentication service the server creates a new authentication stack. Each element in the stack refers either to a local or to a remote module. Some of the entries of the stack may have been configured such that they are unable to render an actual authentication service but in fact trigger an authentication component that is remotely deployed. The processing of this remote component will create the actual authentication context necessary to handle the user authentication process on a specific authentication device. The authentication devices may be one of various biometrics schemes or it may be a cryptographic hardware service or appliance or it could be a smart card, USB token etc. The main authentication process that sits on the authentication server consolidates the results that it gets back from all of the virtual stack entities. It combines the consolidated results with the stack entries bound to the local authentication modules in order to reconstitute the entire authentication stack.

Figure 2:
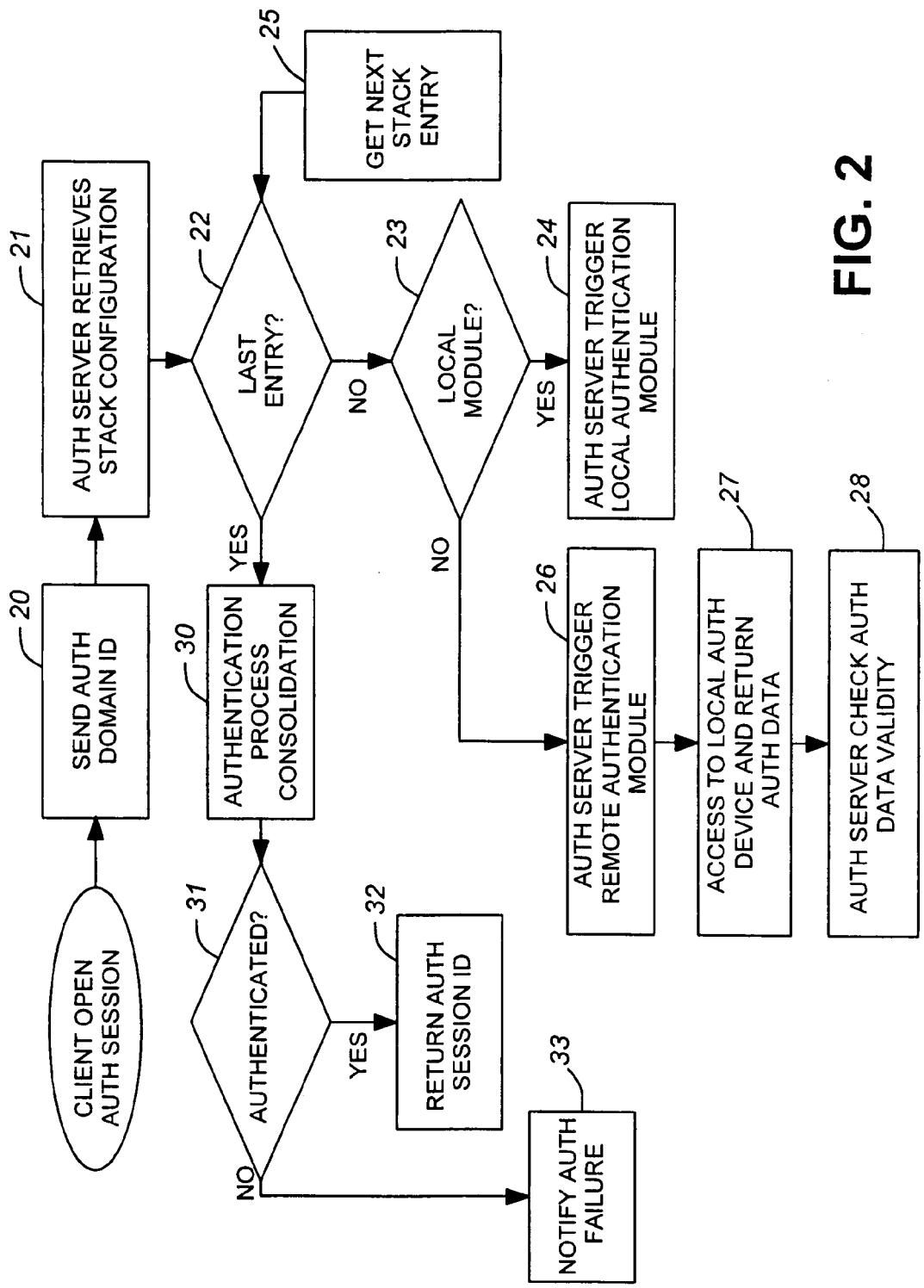
FIG. 2 is a flow diagram of the overall authentication process.

FIG. 2 is a flow diagram that sets out the overall authentication process flow.

First the client to be authenticated sends to the authentication server a so called authentication domain ID, shown in step 20. The authentication domain ID could be, for example, an application service identifier. The authentication server builds the authentication stack according to the configuration defined by the specific ID, as shown in steps 21, 22, 23, 24 and 25. Hence, a direct mapping must be explicitly defined on the authentication server to map an application ID with a list of software modules, which is shown intuitively by database 50. An example of the configuration could be:

Application 1
   RADIUSmodule
   OSmodule

Application 2
   SMARTCARDmodule
   OSmodule
   KERBEROSmodule

At initiation of the authentication process each entry in the authentication stack is processed. If the entry is mapped to a local authentication module, branch "Yes" of decision block 23, the authentication process is performed locally, by triggering the local authentication module as shown in step 24. Otherwise, shown by branch "No" of decision block 23, the authentication server triggers a remote authentication module, step 26, which retrieves authentication data from its local authentication device, step 27. The authentication server then checks the validity of the data, shown in step 28. Once all the stack entries have been processed, branch "Yes" of decision block 22, the authentication server consolidates the results, shown in step 30. If the authentication is successful, branch "Yes" of block 31, a unique session identifier characterising the authentication session is sent back to the client, step 32. Otherwise, branch "No" of decision block 31, the client is notified by the authentication server that the authentication process is failed, step 33.

Figure 3:
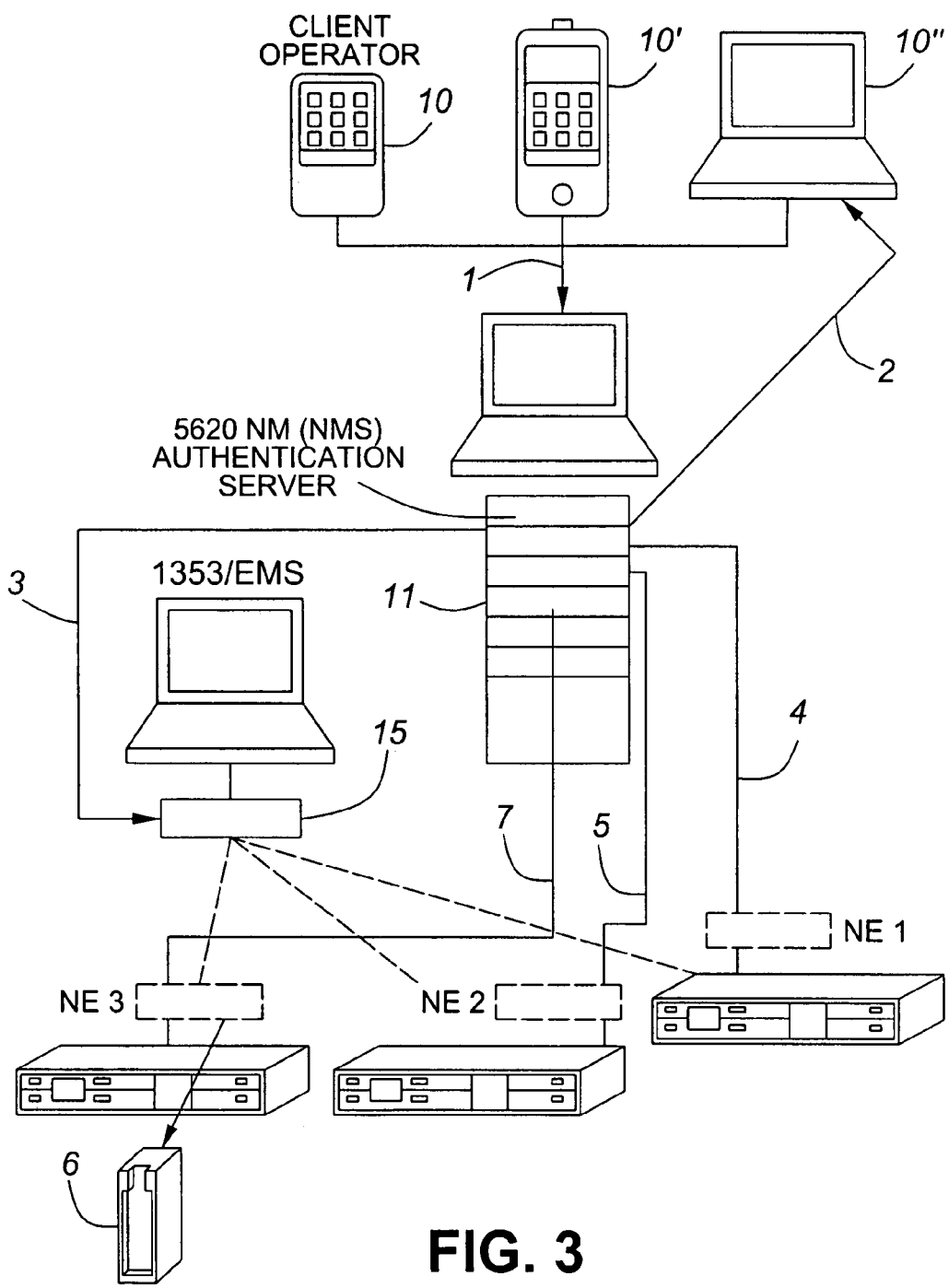
FIG. 3 illustrates the invention in a per distributed application basis.

FIG. 3 illustrates that by using the authentication stack module it is possible to reach different modules located on different applications running on different levels of the management network depending on the specific application. Thus, the solution provided by the present invention is easily deployed on a per distributed application basis. The solution leverages authentication synchronization capabilities into distributed environments where various software components using different authentication techniques need to share a common user authentication session. Thus the authentication requirements could be different depending if it is an alarm manager or more specific to the element management.

As shown in FIG. 3 the client operator 10, 10' or 10" connects to the network management system 5620 NM (NMS) which runs the authentication server 11. This is shown intuitively by arrow denoted with 1 on FIG. 3. The authentication server triggers the authentication module that sits on the client and this could be OS, USB-tokens, smartcards etc., arrow denoted with 2. It then triggers the Element Management System authentication module 15, arrow 3, which may be running for example on an element management system 1353/EMS. Then the authentication server 11 could trigger, arrows 4, 5, authentication modules 13, 13' that are running on the network element NE3 (or NE1, NE2) relaying the request to a remote authentication server 6 such as radius.

Figure 4:
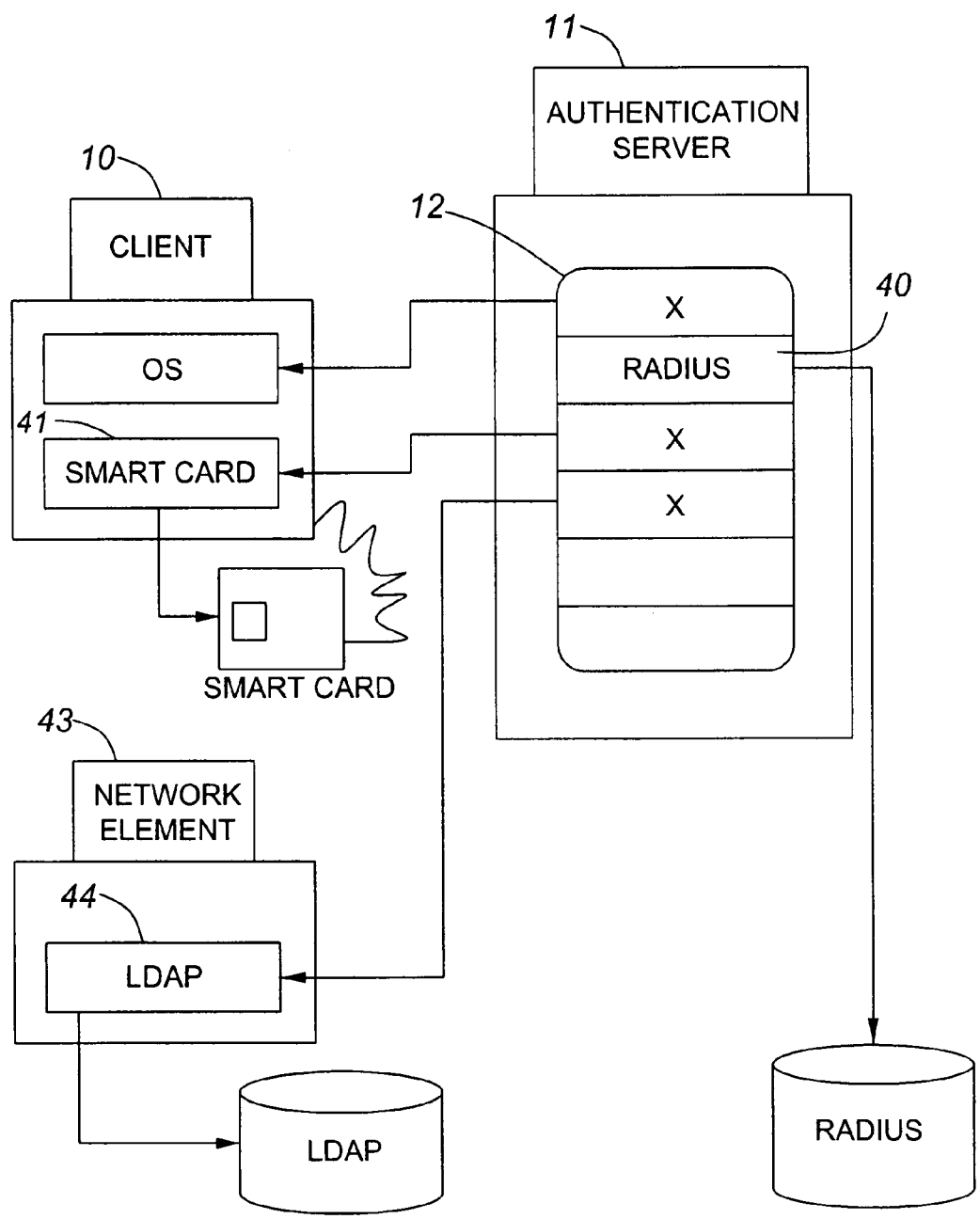
FIG. 4 illustrates a deployment use-case of the authentication stacks.

FIG. 4 exemplifies a deployment use case of the authentication stack in the course of an authentication process. In this case the client authentication involves different steps. A dedicated authentication module that sits on the client 10 handles the operating system based authentication and retrieves OS credentials of the current logged in user. A server component 40 on authentication server 11 handles directly the RADIUS based authentication and a smartcard authentication module 41 handles authentication requests on the client side. The authentication module retrieves user credentials thanks to its direct access to the local smartcard reader appliance 43. An LDAP (lightweight directory access protocol) module 44 that sits on a specific network element 43 handles the authentication requests and access to the LDAP backend is performed through a dedicated LDAP module.

The solution provided by the present invention provides a flexible manner of aggregating various kinds of authentication mechanisms relying on different network nodes into a centralized authentication stack. In addition to greater flexibility the compartmentalised nature of the solution makes the initial configuration and subsequent maintenance of authentication modules easier than the prior art approaches. Furthermore, the versatility of such a framework allows reconfiguration of authentication modules in a seamless way from an end user standpoint. The versatility of this framework is inherent to the distributed authentication stack entries. Hence a security administrator is able to deploy remote authentication indifferently through the network premises and into the core telecom infrastructure as well.

The solution requires the establishment of a secure channel between the client and the authentication server. Depending on the mechanism used this can introduce the requirement to provide extra resources both by the client and by the authentication server which may delay somewhat the overall authentication process.

Although specific embodiments of the invention have been illustrated and described it will be apparent to one skilled in the art that numerous changes can be made without departing from the basic concept. It is to be understood, however, that such changes will fall within the full scope of the invention as defined by the appended claims.

The invention claimed is:

1. A method of authenticating end-user clients requiring access to services available in a computer-based communication system having an authentication server and an end-user client, comprising the steps of:

at said authentication server, defining a plurality of authentication modules available in said communication system, wherein at least one of said authentication modules is a local authentication module executable on said authentication server, and at least one of said authentication modules is a remote authentication module, executable on a communication system node remote from said authentication server;

mapping each of a plurality of authentication domain identifiers to a corresponding configuration of said authentication modules associated with the authenticating domain identifiers, wherein at least one of said authenticating domain identifiers comprises an application service identifier;

sending one of said authentication domain identifiers from said end-user client to said authentication server;

creating, by the authentication server an authentication stack based on the configuration of authentication modules corresponding to the authentication domain identifier according to said mapping step, wherein said authentication stack comprises a plurality of stack entries, each of said stack entries mapped to a respective authentication module from among said plurality of authentication modules;

initiating a distributed authentication process at said authentication server according to each of said stack entries of said authentication stack, said initiating comprising:

i) determining, for each of stack entries from said stack entries, whether the stack entry is mapped to any of the local authentication modules and whether the stack entry is mapped to any of the remote authentication modules, ii) for each stack entry determined as mapped to a local authentication process, triggering a local authentication process corresponding to said local authentication module, and iii) for each stack entry determined as mapped to any of the remote authentication modules, triggering a remote authentication process, corresponding to said remote authentication module, at a node of said communication system remote from said authentication server;

consolidating results of said authentication process, including receiving a result of all local authentication processes and of all remote authentication processes triggered by said step of initiating an authentication process, and generating a consolidated result; and determining an authentication status for the end-user client to be one of a successful authentication and a not successful authentication, based on said consolidated result.

2. The method of claim 1 wherein the remote authentication processes include at least one of biometric schemes, cryptographic hardware services, smart cards and USB tokens.

3. The method of claim 1 further comprising, sending a unique session identifier to the end-user client responsive to said determining an authentication status to be a successful authentication.

* * * * *

UNITED STATES PATENT AND TRADEMARK OFFICE
CERTIFICATE OF CORRECTION

PATENT NO. : 7,631,344 B2  Page 1 of 1
APPLICATION NO. : 10/699665
DATED : December 8, 2009
INVENTOR(S) : Gustave et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1021 days.

Signed and Sealed this

Twenty-first Day of December, 2010

David J. Kappos
*Director of the United States Patent and Trademark Office*